United States Patent [19]

Mickael

[11] Patent Number: 5,532,481

[45] Date of Patent: Jul. 2, 1996

[54] SYSTEM FOR MEASURING EPITHERMAL NEUTRON POROSITY HAVING REDUCED BOREHOLE EFFECT

[75] Inventor: Medhat W. Mickael, Sugar Land, Tex.

[73] Assignee: Western Atlas International, Inc., Houston, Tex.

[21] Appl. No.: 409,268

[22] Filed: Mar. 23, 1995

[51] Int. Cl.$^6$ ..................................................... G01V 5/10
[52] U.S. Cl. ....................... 250/269.4; 250/266; 250/268; 250/269.8
[58] Field of Search ............................ 250/269.8, 269.4, 250/264–266, 268

[56] References Cited

U.S. PATENT DOCUMENTS

| | | | |
|---|---|---|---|
| 3,487,211 | 12/1969 | Youmans | 250/269.4 |
| 4,760,252 | 7/1988 | Albats et al. | 250/269.4 |
| 4,910,397 | 3/1990 | Mills et al. | 250/264 |
| 5,051,581 | 9/1991 | Hertzog et al. | 250/269.4 |
| 5,068,531 | 11/1991 | Allen et al. | 250/269.4 |

Primary Examiner—Carolyn E. Fields
Attorney, Agent, or Firm—Richard A. Fagin

[57] ABSTRACT

The invention is a system for determining the epithermal neutron decay rate of an earth formation penetrated by a wellbore. A method according to the present invention includes the steps of irradiating the formation with bursts of high energy neutrons from a source disposed on a logging tool, detecting epithermal neutrons at a first detector primarily sensitive to epithermal neutrons entering the tool from the earth formation, detecting epithermal neutrons at a second detector primarily sensitive to epithermal neutrons entering the tool from the wellbore, determining a first time at which a maximum counting rate occurs the first detector, scaling the count rates at the second detector to match the count rate at the first detector at the first time, determining a second time at which both detectors measure the same count rate of thermal neutrons, and determining the formation epithermal neutron decay rate by solving a linear least-squares fit function of the difference in counting rates between the first and the second detectors occurring between the first time and a predetermined portion of the second time.

11 Claims, 10 Drawing Sheets

SYSTEM FOR MEASURING EPITHERMAL NEUTRON POROSITY HAVING REDUCED BOREHOLE EFFECT

BACKGROUND OF THE INVENTION

1. Field of the Invention

The present invention is related to the field of wellbore logging tools used for determining porosity of an earth formation. More specifically, the present invention concerns a system for measuring porosity of an earth formation using epithermal neutron decay rate, the system having reduced effect of the wellbore.

2. Discussion of the Related Art

Wellbores are drilled into earth formations for the purpose, among others, of extracting oil and gas. Earth formations which can produce oil or gas typically contain the oil or gas in voids, or pore spaces, which exist in some earth formations. Various instruments have been devised to be lowered into the wellbore to measure the fractional volume of the pore spaces, called the porosity, in order to enable determination of the quantity of oil or gas which may be present within a particular earth formation.

Instruments known in the art for determining the porosity include epithermal neutron tools. Epithermal neutron tools are typically lowered into the wellbore at one end of an armored electrical cable and send signals back along the cable to equipment located at the earth's surface wherein the signals are decoded and interpreted. The signals correspond to properties of the earth formations related to the interaction of high energy neutrons with the earth formation.

The epithermal neutron tools known in the art include devices such as one described, for example, in U.S. Pat. No. 3,487,211 issued to Youmans. The tool in the Youmans patent comprises an electrically controllable source of high energy neutrons, and at least one detector which is sensitive to epithermal neutrons. The neutron source is periodically activated to irradiate the earth formation with short duration "bursts" of high energy neutrons, and the detector is operated to measure a quantity of epithermal neutrons occurring between successive bursts from the neutron source. The quantity of epithermal neutrons can be related to the porosity of the earth formation.

A limitation of the tool disclosed in the Youmans patent is that the tool is adapted only to count the number of epithermal neutrons detected within a predetermined period of time. The neutron output of the source described in the Youmans patent is subject to small, unpredictable variations. Variations in the source output can affect the accuracy of a porosity measurement based on numbers of epithermal neutrons detected in a predetermined time period.

Another epithermal neutron tool is disclosed, for example, in U.S. Pat. No. 4,910,397 issued to Mills, et al. The tool disclosed in the Mills patent also comprises a controllable source of high energy neutrons, a detector primarily sensitive to epithermal neutrons and a means for determining a rate at which the number of epithermal neutrons detected within a predetermined period of time declines, the rate being called the "die-away", or decay rate. The die-away rate can be related to porosity of the formation.

While the tool disclosed in the Mills patent overcomes some of the limitations of the tool disclosed in the Youmans patent, the tool in the Mills patent, as well as the tool in the Youmans patent, are subject to a limitation in that measurements of the die-away rate can be affected by epithermal neutrons which originate from interaction of the high energy neutrons with atomic nuclei in the wellbore instead of within the earth formation. Formation porosity measurements made by the tools disclosed in the Mills patent and the Youmans patent are therefore affected by the wellbore.

A method of reducing the effects of epithermal neutrons originating from wellbore interaction, and consequent effects on the formation porosity measurements is disclosed, for example, in U.S. Pat. No. 5,068,531 issued to Allen et al. The method disclosed in the Allen patent includes the steps of irradiating the formation with high energy neutrons, measuring the number of epithermal neutrons so as to generate signals representing the epithermal neutron die-away rate, producing intensity signals representing relative amplitudes of epithermal die-away signals caused by the wellbore, the formation and a thermal neutron "background", and then producing a so-called "standoff-corrected" die-away rate corresponding only to the earth formation by comparing weighted moments of the amplitude signals to a die-away rate model corresponding to the die-away rates of the wellbore and the formation.

A limitation to the method disclosed in the Allen patent is that it requires at least an initial estimate of the die-away rates for the wellbore and the formation, and it requires an iterative computation to generate values of formation die-away and borehole die-away rates. The iterative computation can make using the technique disclosed in the Allen patent impractical for a tool which is intended to generate measurements of formation and wellbore die-away rates in real time at the wellbore.

A further limitation to the method disclosed in the Allen patent is that it requires the use of empirical data to generate accurate so-called "standoff" models. Experiments to determine the desirable number of data points for generating an accurate standoff model can be difficult and expensive to perform.

Accordingly, it is an object of the present invention to provide a wellbore logging tool capable of generating epithermal neutron die-away rate measurements for the earth formation adjusted for effects of the wellbore substantially in real time.

It is a further object of the present invention to provide a method of measuring formation porosity using epithermal neutron die-away rate measurements which is relatively insensitive to effects of the wellbore, and can be performed substantially without the need for prior experimentation to characterize the effects of various wellbore models.

SUMMARY OF THE INVENTION

The invention is a system for determining the epithermal neutron decay rate of an earth formation penetrated by a wellbore. A method according to the present invention includes the steps of irradiating the formation with bursts of high energy neutrons from a source disposed on a logging tool, detecting epithermal neutrons at a first detector primarily sensitive to epithermal neutrons entering the tool from the earth formation, detecting epithermal neutrons at a second detector primarily sensitive to epithermal neutrons entering the tool from the wellbore, determining a first time at which a maximum counting rate occurs the first detector, scaling the count rates at the second detector to match the count rate at the first detector at the first time, determining a second time at which both detectors measure the same count rate of thermal neutrons, and determining the formation epithermal neutron decay rate by solving a linear least-squares fit function of the difference in counting rates between the first and the second detectors occurring between the first time and a predetermined portion of the second time.

A logging tool according to the present invention includes a housing adapted to traverse the wellbore, a source of high energy neutrons disposed within the housing, a first neutron detector axially spaced apart from the source and adapted to be primarily sensitive to epithermal neutrons emanating from the formation, a second neutron detector axially positioned between the source and the first detector and adapted to be primarily sensitive to epithermal neutrons emanating from the wellbore, a neutron moderator filling substantially the entire volume inside the housing between the first detector and the second detector, and a transceiver for transmitting signals to the earth's surface corresponding to the detection of neutrons by each detector.

DESCRIPTION OF THE PREFERRED EMBODIMENT

The description of the preferred embodiment is divided into two sections. The first section describes the construction and operation of a logging tool according to the present invention. The second part explains the theory of operation and discloses results of laboratory simulation of the logging tool according to the present invention.

Figure 1:
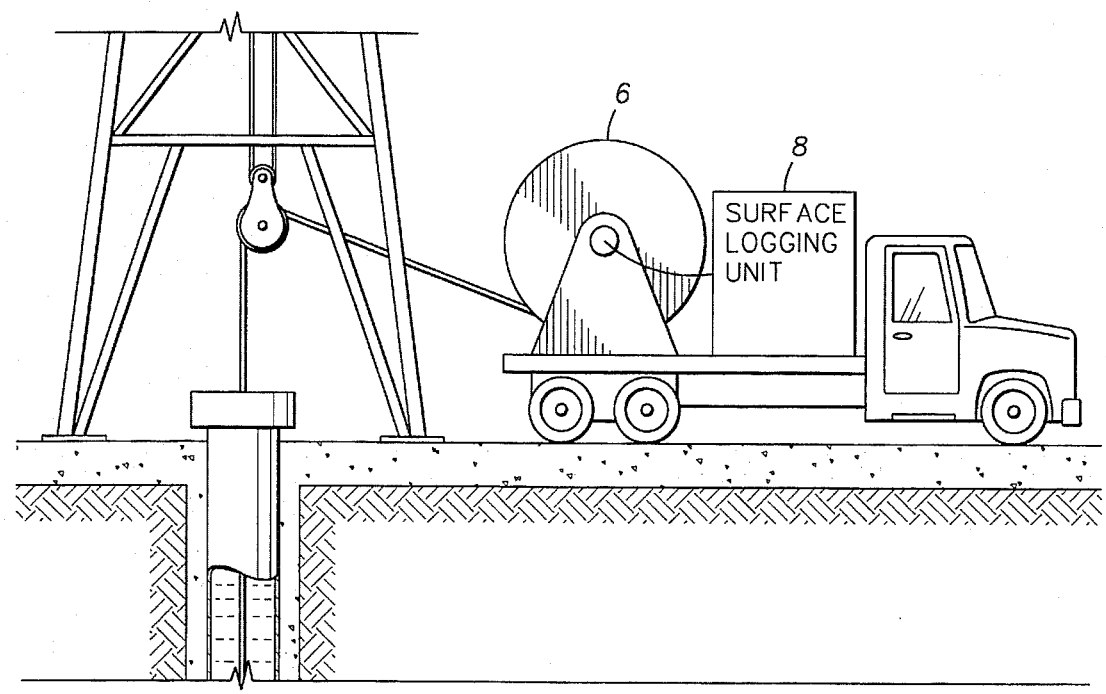
FIG. 1 shows a logging tool according to the present invention disposed in a wellbore penetrating an earth formation.
Figure 1:
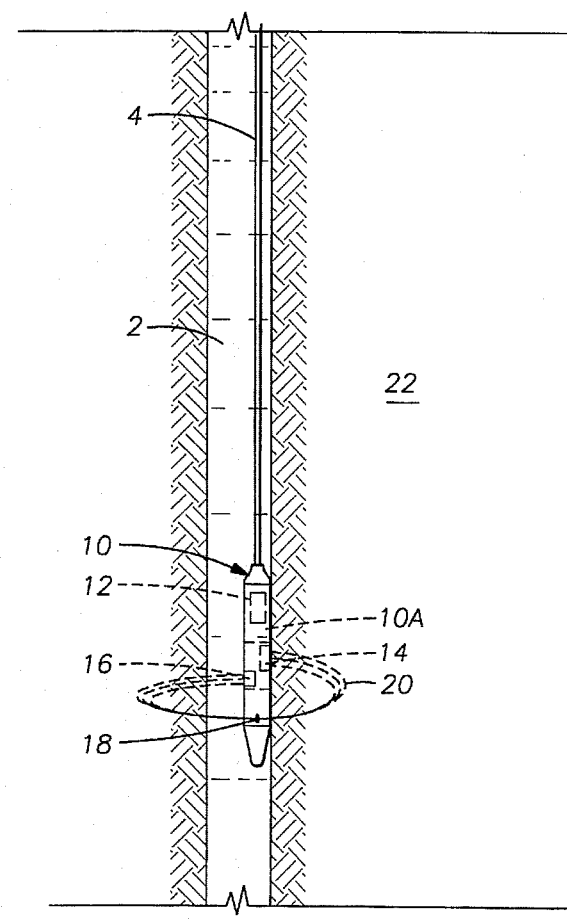

1. Construction and operation of the logging tool according to the present invention The operation of the present invention can be better understood by referring to FIG. 1. A wellbore 2 is drilled to a predetermined depth to penetrate an earth formation 22. A logging tool 10 according to the present invention comprises a source of high energy, or fast, neutrons 18, a first detector 14, a second detector 16 and a transceiver/controller 12 electrically connected to the source 18 and the detectors 14, 16, all of which are disposed within a housing 10A. The housing 10A is typically lowered into the wellbore 4 connected to one end of an armored electrical cable 4. The cable 4 is typically extended into the wellbore 2 by means of a winch 6 or similar equipment located at the earth's surface.

As will be further explained, the source 18 emits periodic "bursts" of high energy neutrons, shown generally at 20, which interact with the earth formation 22. As the neutrons 20 interact with the formation 22 they gradually lose energy by slowing down, and they change direction of travel. Some of the neutrons 20 are eventually returned to the detectors 14, 16, whereupon a signal is generated by each detector 14, 16 each time that detector (14 or 16) detects a neutron. The transceiver 12 imparts signals to the cable 4 corresponding to the detections of neutrons by each detector 14, 16. The signals are decoded and interpreted by surface electronics 8 which can include a computer (not shown separately) used to perform calculations from the decoded signals, as will be further explained.

Figure 2:
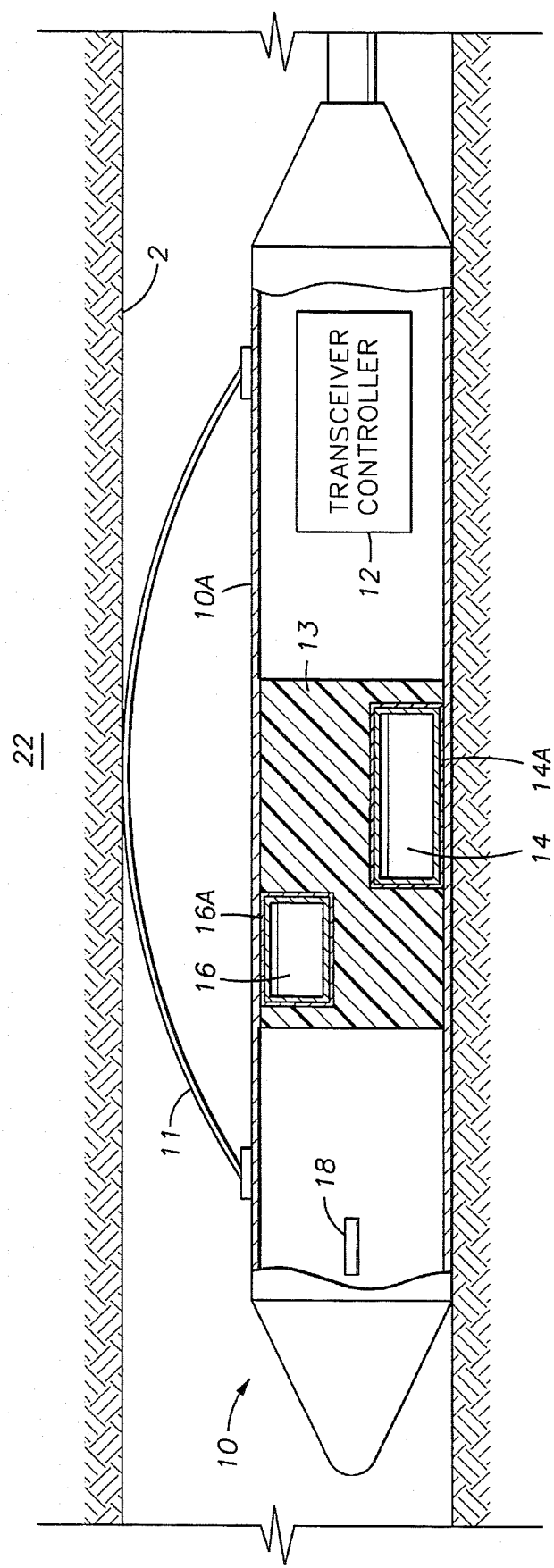
FIG. 2 shows the logging tool of the present invention in more detail.

The construction of the tool 10 according to the present invention is shown in more detail in FIG. 2. The housing 10A contains the source 18 of high energy neutrons. The source 18 in the present embodiment is known in the art and can be a controllable-accelerator type source, one version of which is described, for example, in U.S. Pat. No. 3,487,211 issued to Youmans. The source 18 is typically coaxially located within the housing 10A and it can be disposed near one end of the housing 10A.

The second neutron detector 16 is positioned within the housing 10A axially spaced about six inches from the source 18 and radially positioned to one side of the housing 10A. As will be further explained, the second detector 16 is radially positioned so as to be proximal to the wellbore 2. The second detector 16 can be a helium-3 proportional counter pressurized to 20 atmospheres and being in the shape of a cylinder one inch in diameter and two inches in length. Helium-3 counters are known in the art for detecting epithermal and thermal neutrons. The second detector 16 can be wrapped in cadmium foil, shown at 16A, having a thickness of 0.025 inches. The cadmium foil 16A substantially prevents entry of thermal neutrons into the second detector 16, so that the second detector 16 is sensitive primarily to epithermal neutrons. The sensitivity characteristics of the second detector 16 will be further explained.

The first neutron detector 14 is positioned within the housing 10A axially spaced about eight inches from the source 18. The first detector 14 is radially positioned to the opposite side of the housing 10A as is the second detector 16, and as will be further explained, the first detector 14 is positioned to the side of the housing 10A which typically is in contact with the formation 22. The first detector 14 can also be a helium-3 counter pressurized to 20 atmospheres and shaped substantially cylindrically. The first detector 14 can have a length of eight inches and a diameter of 1¾ inches. The first detector 14 is also typically wrapped in cadmium foil 14A, the foil being 0.025 inches thick so as to make the first detector 14 substantially sensitive to epithermal neutrons.

The thickness of the cadmium foils 14A and 16A is chosen to make the detectors 14 and 16 substantially sensitive to epithermal neutrons, however the thickness of the foils 14A, 16A provides that the detectors 14, 16 retain a small amount of sensitivity to thermal neutrons which must be accounted for in processing of the signals from the detectors 14, 16, as will be further explained. Greater thickness of the cadmium foil 16A, 14A would reduce the sensitivity of the detectors 16, 14 to thermal neutrons, but it would also reduce the sensitivity of the detectors 14, 16 to epithermal neutrons. Further reduced sensitivity of the detectors 14, 16 to epithermal neutrons can make it difficult to determine properties of the formation 22 related to the epithermal neutron population.

In order that the second detector 16 generally be positioned on the side of the housing 10A towards the wellbore 2, as previously described herein, so as to be primarily responsive to epithermal neutrons entering the housing 10A from the wellbore 2, the housing 10A includes an eccentering device, shown as a bowspring 11, attached to the side of the housing 10A which is to be positioned away from the earth formation 22. The bowspring 11 of the present embodiment is of a type familiar to those skilled in the art. It is contemplated that other types of eccentering devices such as spring- or hydraulically- powered arms (not shown) could also be used to position the housing 10A inside the wellbore 2.

Since the first detector 14 is positioned on the side of the housing 10A opposite to the second detector 16, the first detector 14 will typically remain proximal to the formation 22, and therefore will respond primarily to epithermal neutrons which enter the housing 10A from the formation 22.

Substantially the entire volume inside the housing 10A between the first detector 14 and the second detector 16 is filled with a neutron moderator 13. As is understood by those skilled in the art, the moderator 13 can be composed of plastic such as polypropylene or another material having a high concentration of hydrogen nuclei, so that the moderator 13 quickly reduces the energy of neutrons. Neutrons which may enter the housing 10A from a direction other than the previously described intended sensitive directions of the first 14 and the second 16 detectors, are slowed down by the moderator 13 so that these neutrons typically are stopped by the cadmium foil 16A, 14A surrounding each of the detectors 16, 14. The configuration of the detectors 16, 14 and the moderator 13 results in the second detector 16 responding primarily to epithermal neutrons from the wellbore 2, and the first detector 14 responding primarily to epithermal neutrons from the formation 22.

2. Theory of operation and simulation results

The construction of the tool 10 according to the present invention having been described, a description of the theory of operation of the present invention will now be provided.

The controller/transceiver 12 in the tool 10 comprises a circuit (not shown separately) which is programmed to operate the neutron source 18 to emit periodic, short-duration "bursts" of high energy neutrons. The high energy neutrons collide with atomic nuclei of matter in the wellbore 2 and in the formation 22, both of which surround the tool 10. Upon each collision a neutron loses some of its energy, the neutron energy being proportional to the neutron velocity, and the neutron can change direction. Eventually some of the neutrons slow down to reach the epithermal, and then the thermal energy level, whereupon those neutrons can be detected by one of the detectors 14, 16, or absorbed by constituents sometimes forming part of the formation 22 which are absorptive of thermal neutrons, such as chlorine.

The amount of time taken for neutrons to slow down to the epithermal energy level is generally inversely related to the concentration of hydrogen nuclei in the formation 22 and in the wellbore 2 because each hydrogen nucleus has almost the same mass as a neutron. A large portion of the momentum of a neutron is therefore transferred to a hydrogen nucleus upon collision of the neutron with the hydrogen nucleus, whereas neutron collisions with more massive atomic nuclei results in very little of the neutron momentum being transferred to the more massive nuclei upon each such collision.

Hydrogen nuclei are typically present in fluids (not shown) which can be present in voids or pore spaces in the formation 22, and in liquid (not shown) which typically fills the wellbore 2. As is understood by those skilled in the art, the concentration of hydrogen nuclei in the formation 22 can be related to the liquid-filled fractional volume of voids, this fractional volume being called porosity. The time taken for neutrons to reach the epithermal energy level in the formation 22 therefore is also inversely related to the liquid-filled porosity of the formation 22.

As previously described, the controller/transceiver 12 imparts signals to the cable (shown in FIG. 1 as 4) corresponding to detections of neutrons by each of the detectors 14, 16. The signals are decoded by the surface electronics (shown in FIG. 1 as 8) wherein a counting rate corresponding to each detector 14, 16 is determined.

At any time t after the burst from the neutron source 18, the counting rate $R_1(t)$ of the first detector 14 can be described by the following relationship:

$$R_1(t) = A_1 e^{-t/\tau_1} + A_2 e^{-t/\tau_2} + A_3 e^{-t/\tau_3} \qquad (1)$$

where $A_1$, $A_2$, and $A_3$, respectively, are relative amplitudes of each of three epithermal neutron decay components contributing to the overall counting rate: wellbore, formation and thermal background, which in total comprise the counting rate $R_1(t)$ of the first detector 14. $\tau_1$, $\tau_2$, and $\tau_3$, respectively, are the epithermal neutron decay rates attributable to the wellbore 2, the formation 22, and as previously explained the decay rate of thermal neutrons which may be detected by the first detector 14. $\tau_2$, the epithermal neutron decay rate attributable to the formation 22, is the quantity of interest which is to be determined.

Figure 3:
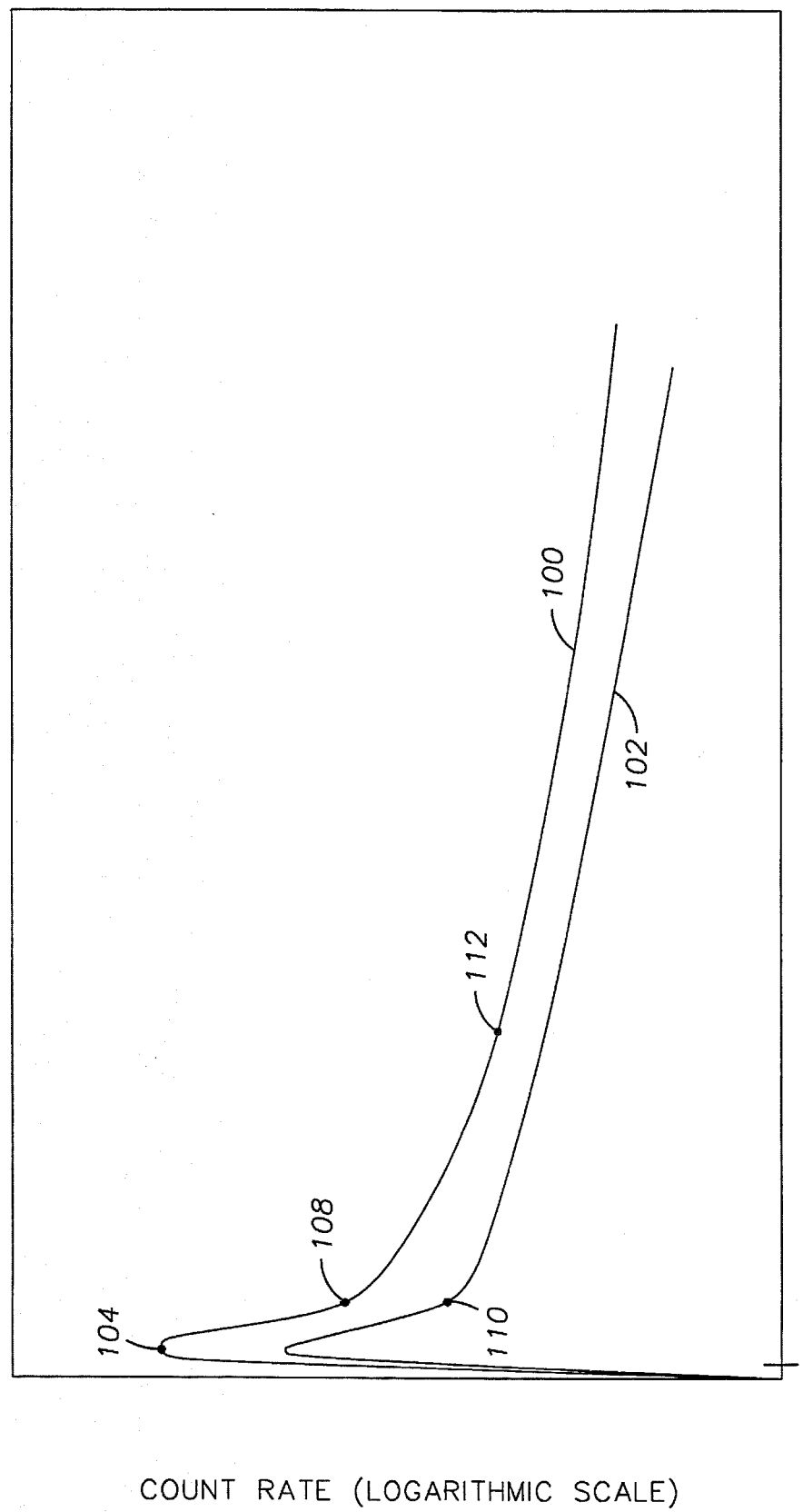
FIG. 3 shows count rate curves for the detectors of the present invention.

The counting rates of the first detector 14 and the second detector 16 (whose counting rate components will be further explained) can be better understood by referring to FIG. 3, which is a graphic representation of the counting rates at the detectors 14, 16 with respect to time. The counting rate of the first detector (shown in FIG. 3 as 14) is shown as a first curve 100. The counting rate of the second detector (shown in FIG. 3 as 16) is shown as a second curve 102. The first curve 100 exhibits a substantially linear decline, at a first particular slope, between the end of the burst, shown at point 104 and indicated on the time axis as $T_B$, and the beginning of a second linear decline having a second slope starting at point 108. The first slope is related to the epithermal neutron decay rate in the wellbore (shown as 2 in FIG. 1). The second slope between points 108 and 112 is generally related to the epithermal decay rate in the formation (shown in FIG. 1 as 22). The first curve 100 also has a third linear decline having a third slope, between point 112 and the end of the first curve 100, which is related to the thermal neutron decay rate. The graph of FIG. 4 has logarithmic scaling on the ordinate rate axis, so that each of the three slopes exhibited by the first curve 100 corresponds to one of the three exponential decay rates described in equation (1), as exponential decline appears linear on a semi-logarithmic graph.

The second detector (shown in FIG. 2 as 16), as previously described herein, is primarily sensitive to neutrons from the wellbore 2, so the counting rate at the second detector 16, called $R_2(t)$ can be expressed as:

$$R_2(t) = B_1 e^{-t/\tau_1} + B_3 e^{-t/\tau_3} \qquad (2)$$

where $B_1$ and $B_3$ are the relative amplitudes of the wellbore epithermal decay component and thermal neutron decay component of the counting rate $R_2(t)$, respectively. As previously explained, the second detector is relatively insensitive to the formation 22, so a formation decay component does not appear in the expression for the counting rate of the second detector 16.

The second curve 102 in FIG. 3 shows two substantially linear sections having slopes corresponding to the two decay rates as measured by the second detector 16. The second curve 102 exhibits linear decline corresponding to wellbore 2 epithermal neutron decay between points 106 and 110. Point 106 corresponds to the time of the end of the burst, shown on the time axis as $T_B$. The thermal neutron decay decline section for the second curve 102 begins at point 110. The second curve 102 does not exhibit a formation epithermal neutron decay slope section because, as previously explained, the second detector 16 is relatively insensitive to the formation 22.

During the operation of the tool 10, the surface electronics (shown as 8 in FIG. 1), as previously explained, decodes the signals sent by the tool 10 to determine the counting rates of the first 14 and the second 16 detector. The counting rates for each detector are determined within a plurality of predetermined, contiguous time intervals each having a duration of 1 microsecond. In the present embodiment there typically are 100 predetermined time intervals. The first time interval is programmed to begin upon initiation of the burst. Counting rates are then determined for each detector 14, 16 in each of the 100 contiguous time intervals. After the end of the 100 contiguous time intervals, the measurement cycle thus described is repeated, beginning with the burst from the neutron source (shown in FIG. 3 as 18).

The computer (not shown) in the surface electronics 8 is programmed to measure the counting rate of the first detector 14 and of the second detector 16 within approximately the first twenty time intervals, after which time the source 18 burst is turned off. Counting rates at the first detector 14 are searched in the first twenty time intervals for a peak value. The time interval at which the peak value is determined is then tagged as $T_B$. Then a scale factor is calculated by which the count rate of the second detector 16 in the time interval $T_B$ is multiplied so that it matches the count rate of the first detector 14 in that same time interval. Then the count rates for the second detector 16 in each of the subsequent contiguous time intervals are multiplied by the same scale factor thus calculated. The process of scaling the counting rates of the second detector 16 can be better understood by referring to FIG. 4. The first detector 14 counting rate is shown as a first curve 100A, which is substantially the same as the first curve 100 in FIG. 4. All of the counting rates in each of the contiguous time intervals for the second detector 16 are scaled so that in the time interval $T_B$ the counting rates of the first detector 14 and the second detector 16 substantially match, as shown at point 104A. The scaled counting rate curve of the second detector 16, shown as a second curve 102A exhibits a longer section of decline having a first slope, as shown between 104A and 110A, because the second detector 16 is substantially more sensitive to the wellbore 2 than is the first detector 14.

Figure 4:
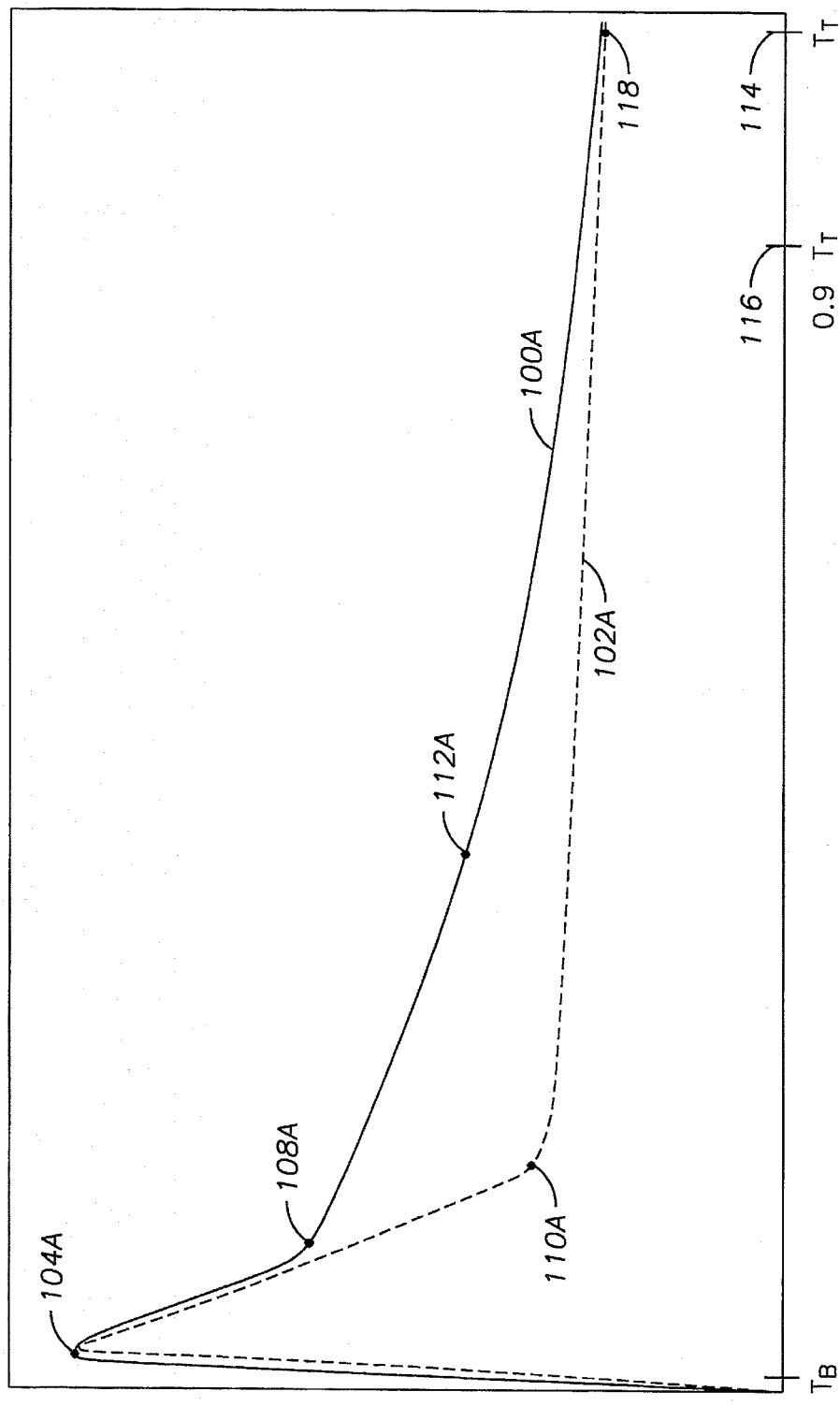
FIG. 4 shows count rate curves for the detectors of the present invention after application of a scale factor to the second detector count rates.

When the count rates of the second 16 detector are scaled as described herein, then there exists a time $\tau_T$, shown at 114, at which the two detectors 14, 16 will have equal count rates, the time $\tau_T$ 114 occurring within the thermal neutron decay region of the count rate curves as shown at point 118 in FIG. 4. The time $\tau_T$ 114 typically occurs after the formation epithermal neutron decay signal (shown in FIG. 4 on curve 100A between points 108A and 112A) has become insignificant in magnitude. At an empirically determined time value, shown at 116, the time being at about 90 percent of the time span from the first time interval at $T_B$, to the time $\tau_T$ 114, the contribution of the thermal neutron decay counts to the count rates $R_1(t)$ and $R_2(t)$ is negligible. Using counting rates for each detector only in the contiguous time intervals preceding 90 percent of $\tau_T$ 114, it is then possible to define the detector counting rates according following relationships, in which the contribution to the total count rates of the thermal neutron decay is ignored:

$$R_1(t) = A_1 e^{-t/\tau_1} + A_2 e^{-t/\tau_2} \quad (3)$$

and;

$$R_2(t) = B_1 e^{-t/\tau_1} \quad (4)$$

A constant $C_1$ can be defined as $A_1/B_1$. $C_1$ will necessarily occur in the range of zero to one because the count rates of the second detector 16 are scaled to match the count rate of the first detector 14 during the contiguous time intervals wherein the contribution of the wellbore 2 decay is predominant in the counting rates. The counting rate at the first detector $R_1(t)$ can therefore be expressed as:

$$R_1(t) = C_1 R_2(t) + A_2 e^{-t/\tau_2} \quad (5)$$

The relationship of equation (5) can be rewritten as shown in the following expression:

$$\ln[R_1(t) - C_1 R_2(t)] = \ln(A_2) - [t/\tau_2] \quad (6)$$

Equation (6) can be solved for $A_2$ and $\tau_2$ by using a linear least-squares technique. $\tau_2$ is the epithermal neutron decay in the formation 22, which is the parameter of interest in determining the liquid-filled porosity of the formation 22. $A_2$ is not used as a numerical value.

The actual numerical value for $C_1$ will be dependent on the axial positions of the first 14 and the second 16 detectors relative to the source 18, and on the sizes and relative sensitivities to epithermal neutrons of the first 14 and the second 16 detectors. Relative sensitivity of a helium-3 counter can be dependent on, for example, the pressure of the helium-3 gas in the counter. The linear least-squares method of determining $C_1$ and $\tau_2$ can be described in that the sum of the squares of the errors in a time distribution having N-channels can be expressed as:

$$\chi^2 = \frac{1}{(N-2)} \Sigma \left[ \ln(R_1 i - C_1 R_2 i) - \ln(A_2) - \frac{t_i}{\tau_2} \right]^2 \quad (7)$$

where the subscript i is the channel number, which in the present embodiment can be in the range of 1 to 100, and $t_i$ is the average time value in the i-th channel. Because the counting rates at the second detector 16 have been scaled, as previously described, $C_1$ must occur within the range of zero to one. The value of $C_1$ is iterated between zero and one until $X^2$ is determined to be a minimum value. Equation (6) is then solved for $A_2$ and $\tau_2$. The iteration used to determine $C_1$ is called binary iteration. End values of zero, 0.5 and one are first used for $C_1$. $X^2$ is measured, and whether it is larger at zero or 0.5, or 0.5 and one is then determined. The process is repeated using 0.25 or 0.75 as the new midpoint depending on the previous result. The iteration continues in this fashion until a value of $C_1$ is determined at which $X^2$ is a minimum.

The result is a measurement corresponding to the epithermal neutron decay rate of the formation 22, from which the effects of the wellbore 2 have been substantially removed. Because the counting rates at the first detector 14 and the second detector 16 will be proportionately affected by small variations in the output of the source 18, the measurement of the formation 22 epithermal decay rate is substantially unaffected by such changes in source 18 output.

The value of epithermal neutron decay rate determined by the method of the present invention can be further used to generate a value of porosity of the formation 22. Methods of calculating porosity from epithermal neutron decay rate are known in the art.

The system of the present invention was tested by Monte Carlo simulation. Monte Carlo simulation is known in the an for simulating the response of nuclear reactions. The tool configuration simulated is described in detail in the previous discussion, and is shown in FIG. 2.

Figure 5:
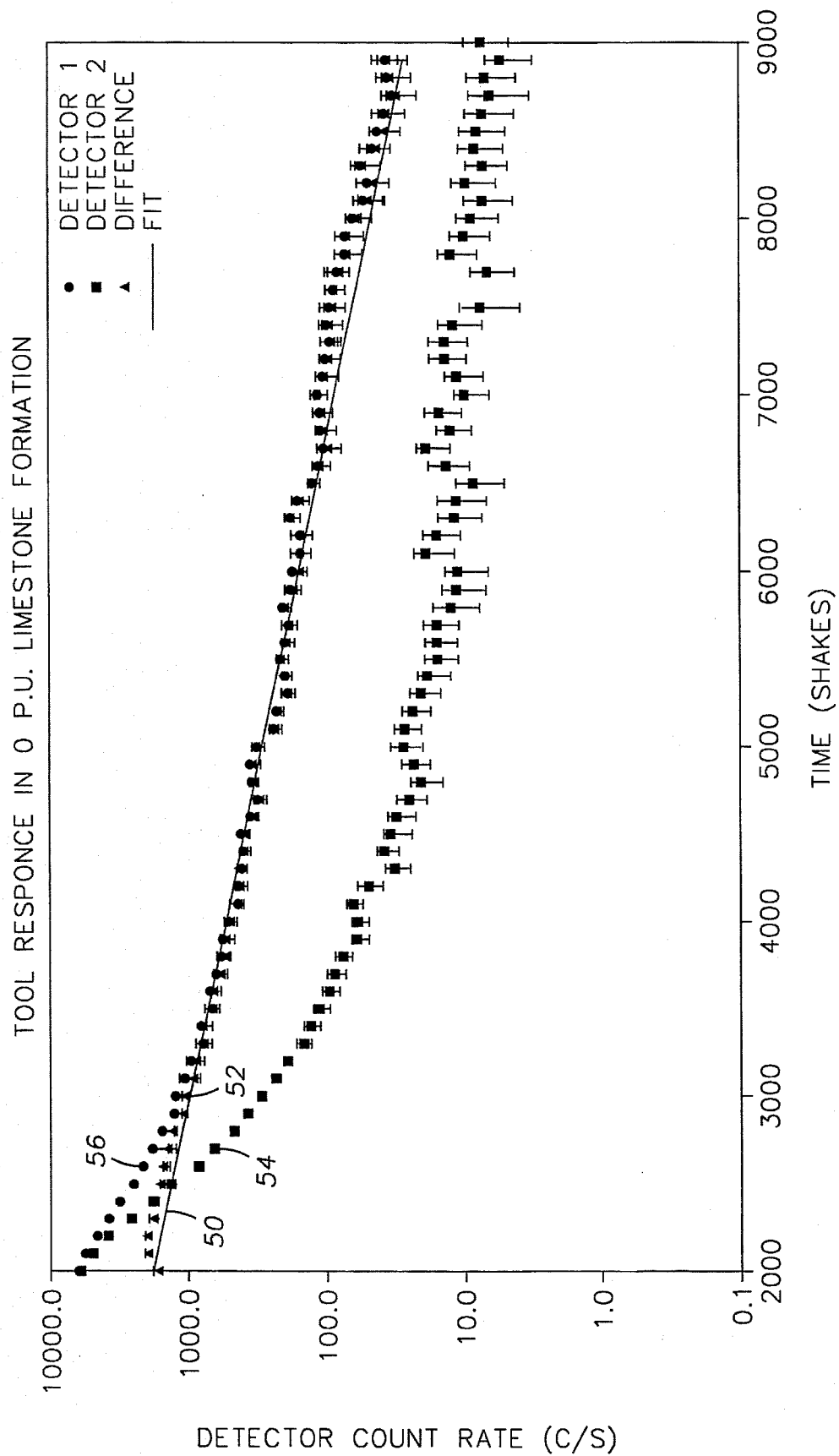
FIG. 5 shows the response of the tool in a non-porous limestone earth formation.

In FIG. 5, the results of a simulation in a non-porous limestone earth formation are shown. The best-fit epithermal neutron decay rate curve is shown at 50. The difference curve corresponding to equation (6) is shown at 52, and the count rate curves for the first detector (shown in FIG. 2 as 14) and the second detector (shown in FIG. 2 as 16) are shown at 56 and 54, respectively. As can be observed by the substantially constant linear character of the epithermal neutron decay curve 52, the early decay caused by effect of the wellbore (shown as 2 in FIG. 1) and the thermal decay have been substantially eliminated.

Figure 6:
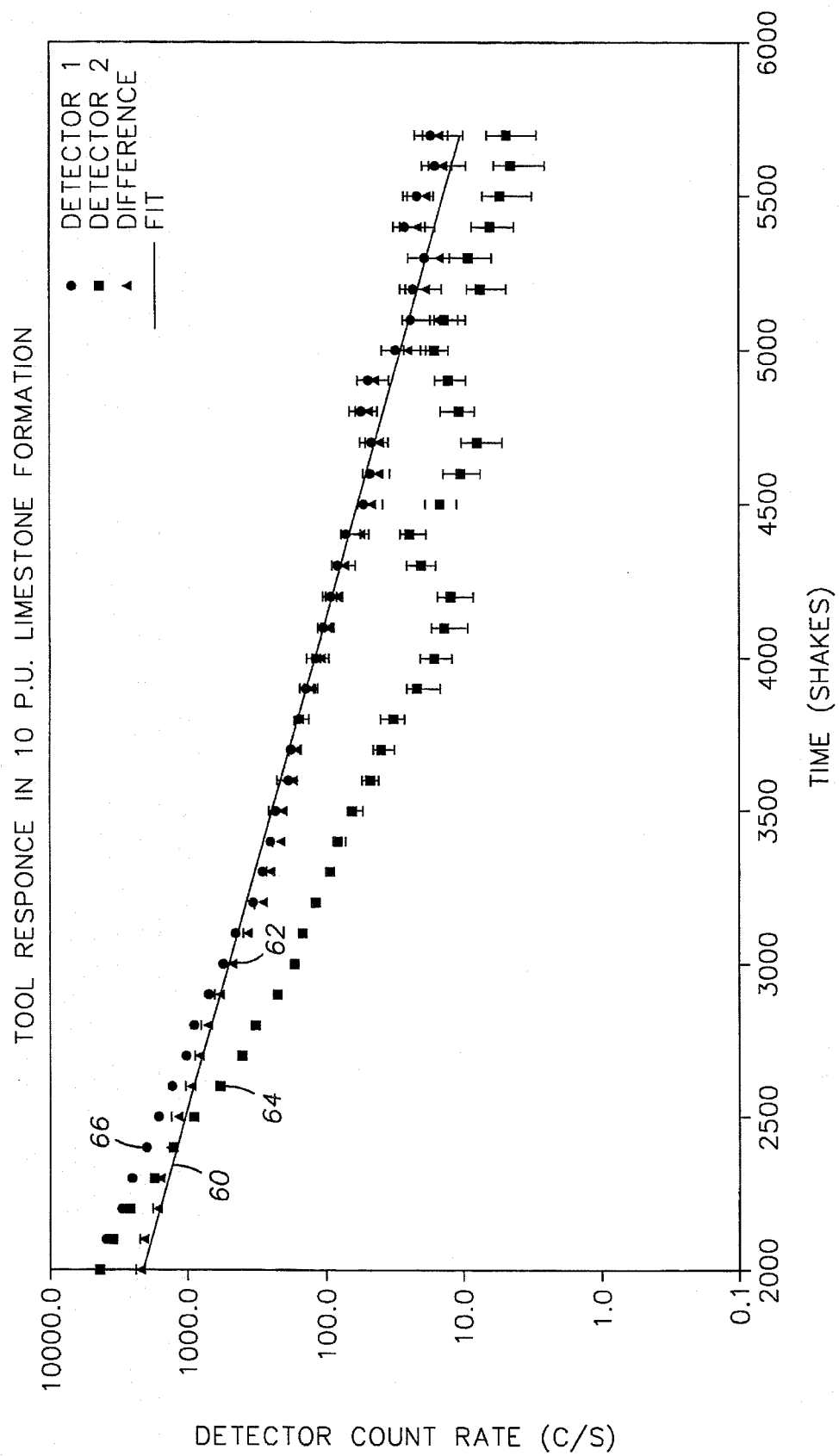
FIG. 6 shows the response of the tool in a 10 percent water-filled porosity limestone formation.

FIG. 6 shows a similar test conducted for a simulated ten percent water-filled porosity limestone formation. The best fit curve is shown at 60, the calculated difference is shown at 62, and the first 14 and second detector 16 count rate curves are shown at 66 and 64, respectively.

Figure 7:
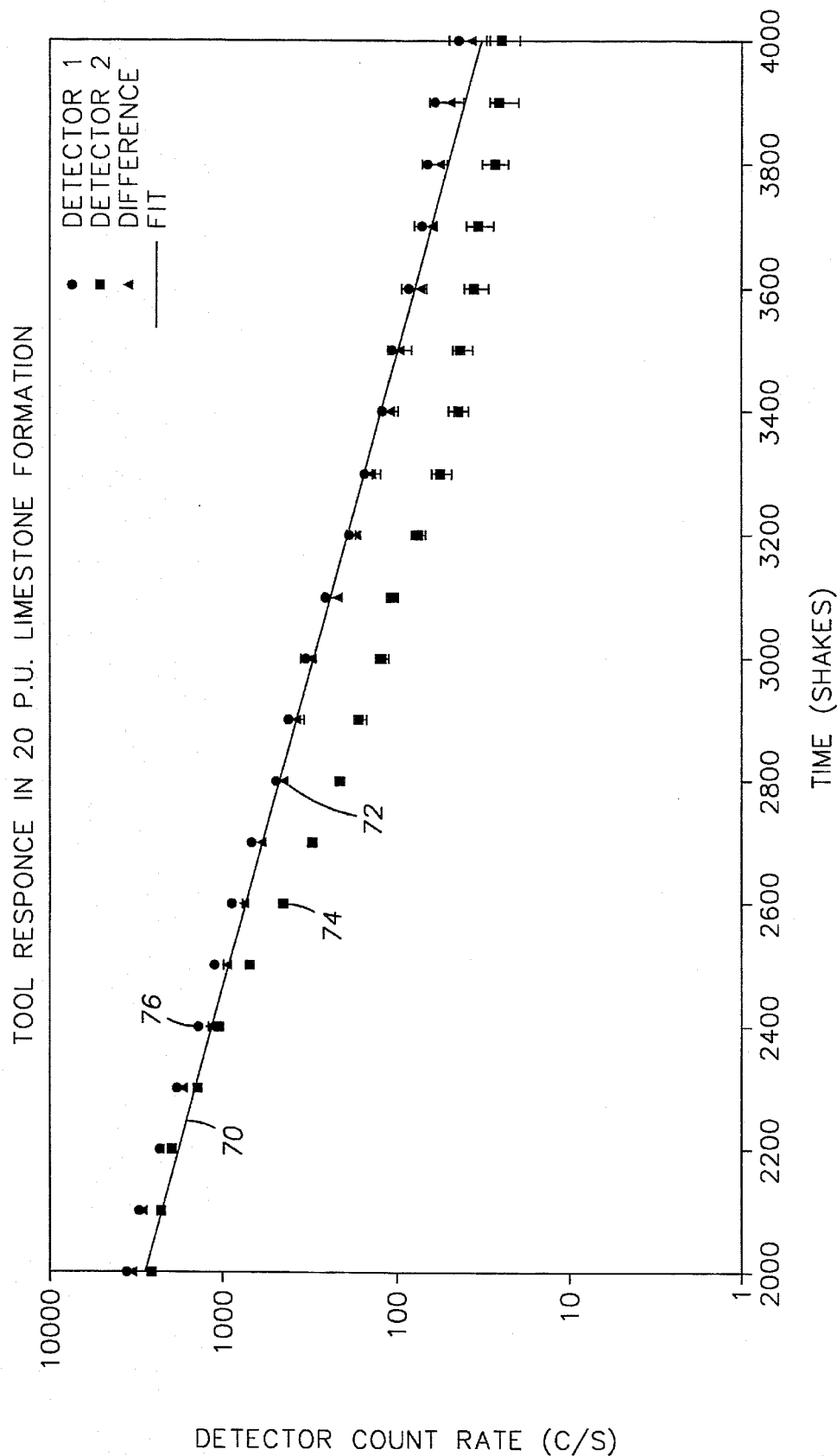
FIG. 7 shows the response of the tool in a 20 percent water-filled porosity limestone formation.

FIG. 7 shows a similar test conducted for a simulated twenty percent water-filled porosity limestone formation. The best fit curve is shown at 70, the calculated difference is shown at 72, and the first 14 and second detector 16 count rate curves are shown at 76 and 74, respectively.

Figure 8:
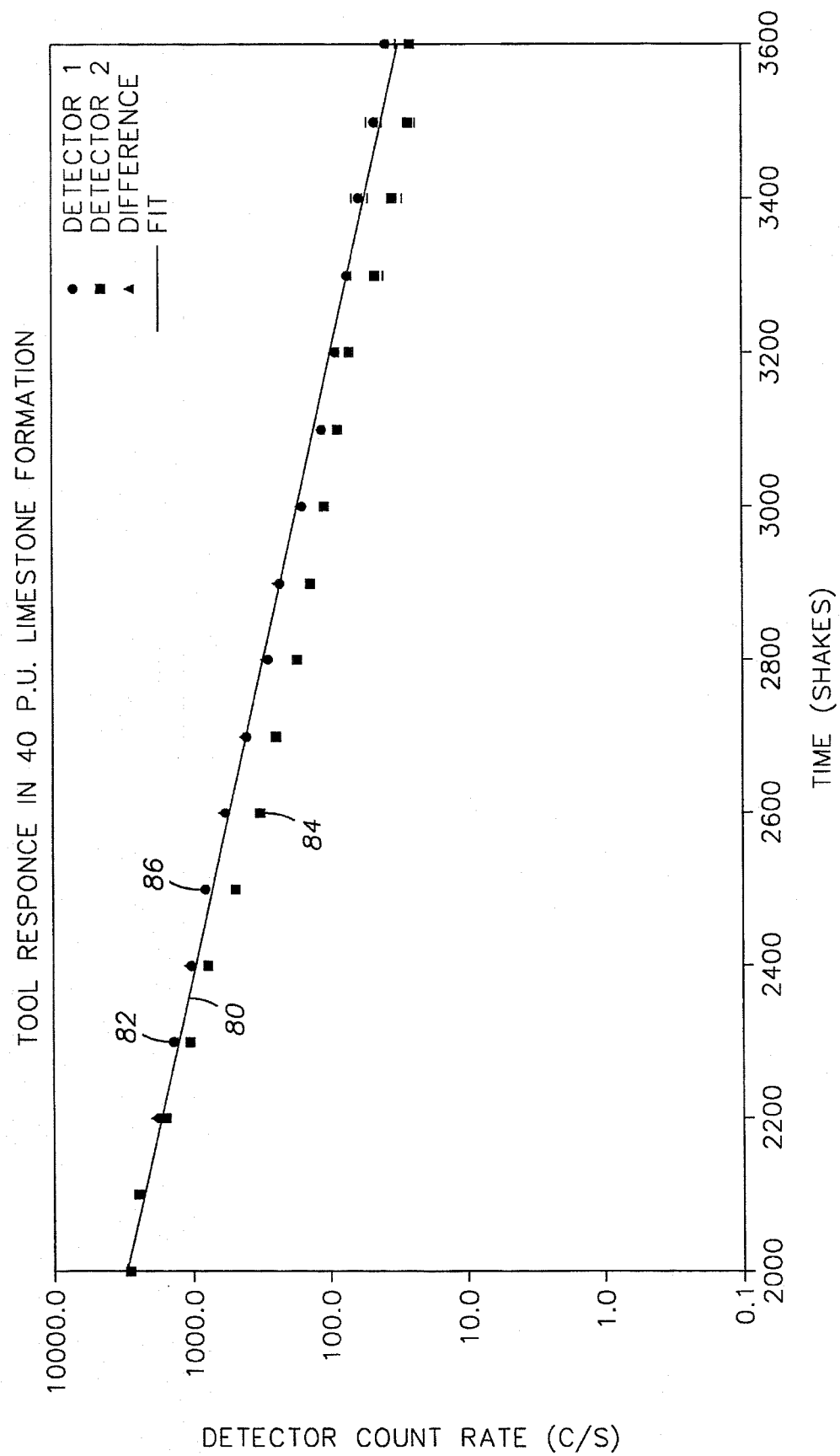
FIG. 8 shows the response of the tool in a 40 percent water-filled porosity limestone formation.

FIG. 8 shows a similar test conducted for a simulated forty percent water-filled porosity limestone formation. The best fit curve is shown at 80, the calculated difference is shown at 82, and the first 14 and second detector 16 count rate curves are shown at 86 and 84, respectively.

Figure 9:
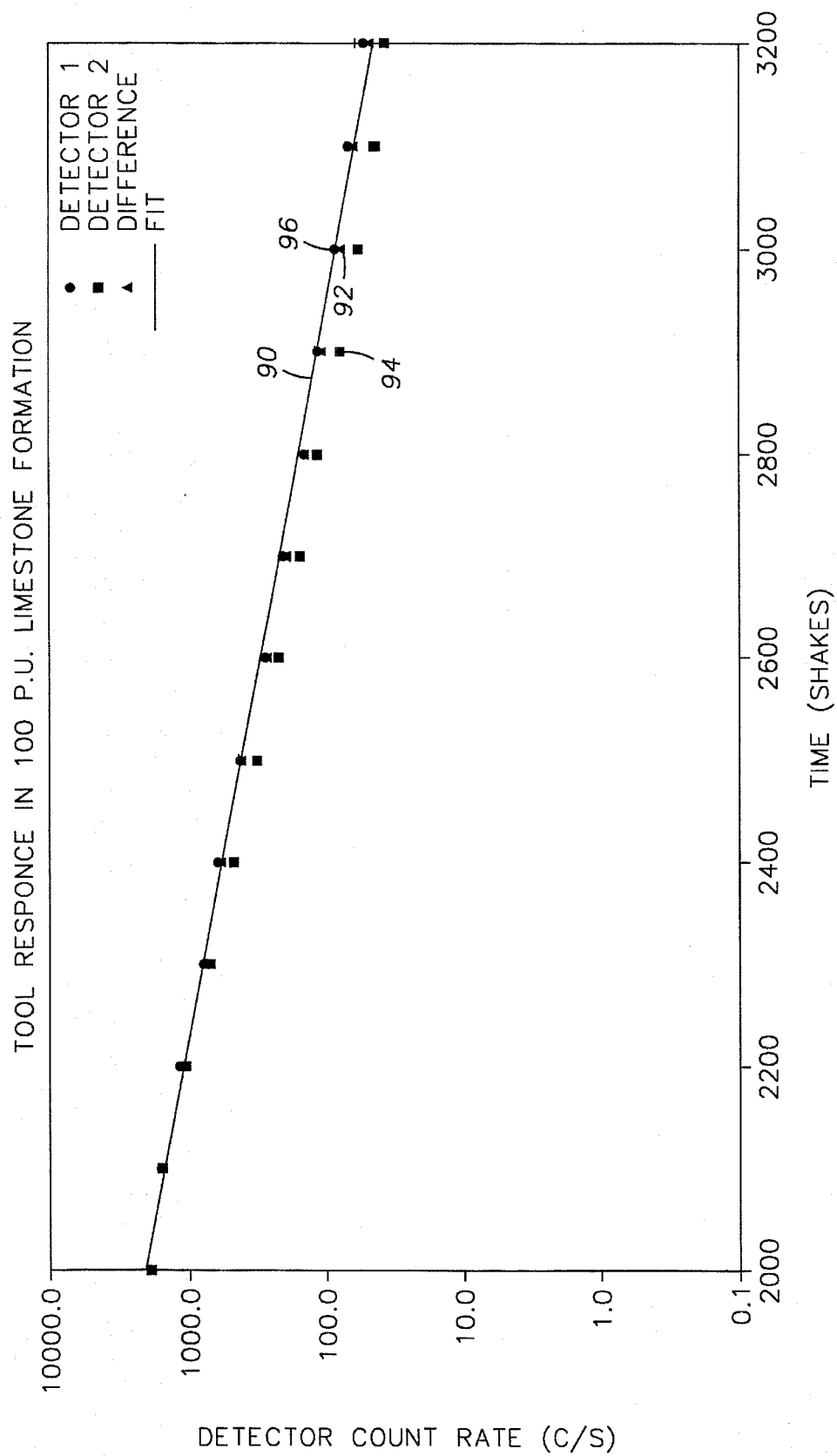
FIG. 9 shows the response of the tool in water.

FIG. 9 shows a similar test conducted for the tool in water, equivalent to a 100 percent porosity formation. The best fit curve is shown at 80, the calculated difference is shown at 82, and the first 14 and second detector 16 count rate curves are shown at 86 and 84, respectively.

Figure 10:
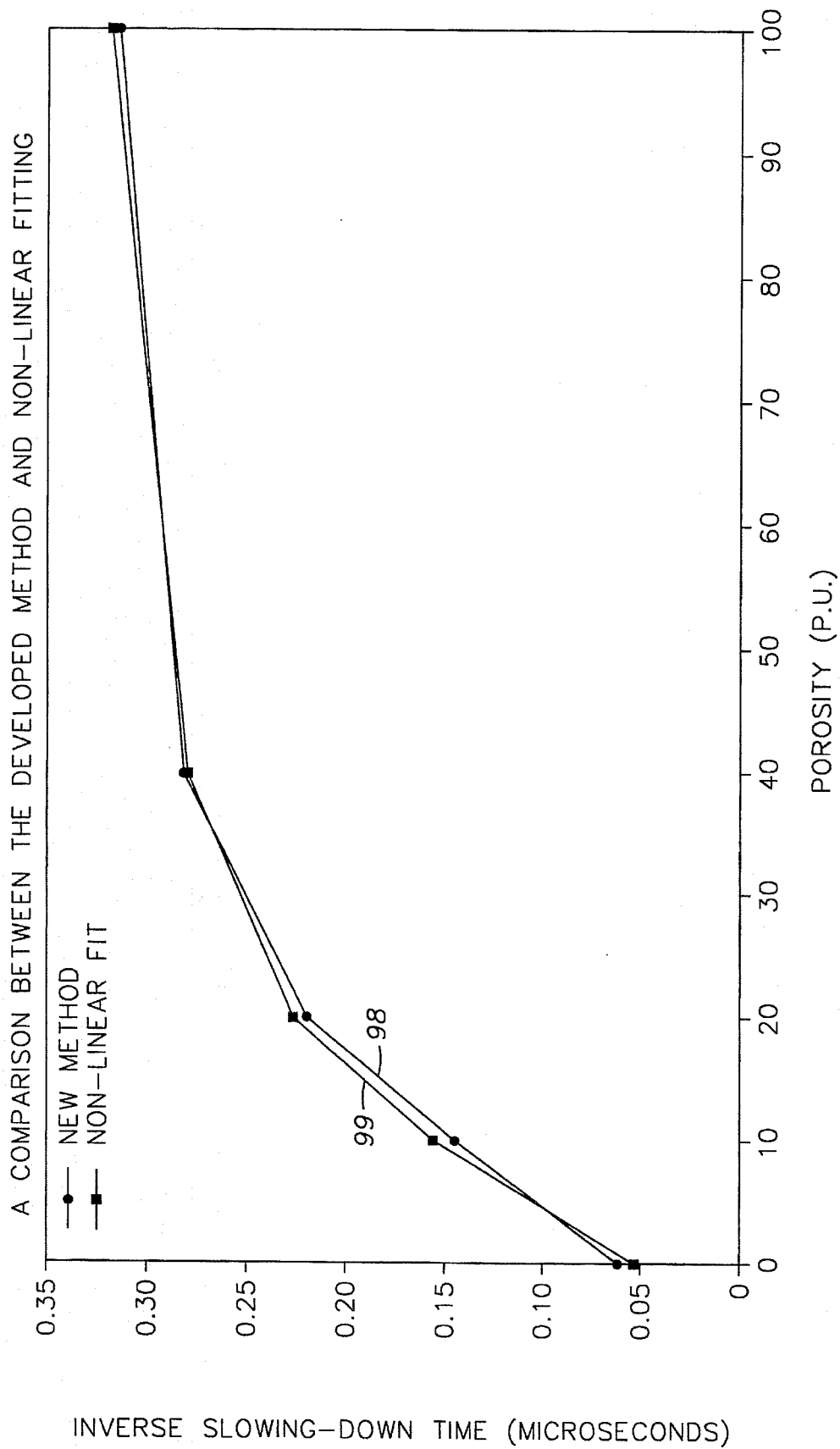
FIG. 10 shows a comparison of tool response using the method of the present invention with the response of a tool using a three-exponent non-linear least squares solution system.

FIG. 10 shows a comparison of the results of a simulation using the method of the present invention with the results of a non-linear least squares solution method of determining epithermal neutron decay time in the formation (shown in FIG. 1 as 22) from the counting rates at the two detectors 14, 16. The curve shown at 98 shows the results of the method of the present invention, and the curve at 99 shows the results using non-linear least squares solution method. The two methods are substantially in agreement.

What is claimed is:

1. A method of determining an epithermal neutron decay rate of an earth formation penetrated by a wellbore, comprising the steps of:

irradiating said earth formation with a burst of high energy neutrons from a neutron source disposed in a logging tool inserted into said wellbore;

detecting neutrons at a first detector adapted to be primarily sensitive to epithermal neutrons emanating from said earth formation;

detecting neutrons at a second detector adapted to be primarily sensitive to epithermal neutrons emanating from said wellbore;

determining a first time after said burst of high energy neutrons wherein a counting rate of said first detector reaches a maximum;

scaling a counting rate of said second detector to match said counting rate of said first detector at said first time at which said counting rate of said first detector reaches a maximum after said bursts of high energy neutrons;

determining a second time after said burst of neutrons at which said first detector and said second detector measure thermal neutrons at substantially the same rate; and determining said epithermal neutron decay rate of said earth formation by generating a linear least-squares fit of a difference in counting rates between said first detector and said second detector between said first time at which said counting rate of said first detector reaches a maximum and a predetermined portion of a time span from said burst to said second time at which said first detector and said second detector measure thermal neutrons at substantially the same rate.

2. The method as defined in claim 1 wherein said step of generating said linear least-squares fit further comprises iteratively determining a minimum value of an error function with respect to a constant, said constant defined as the ratio of amplitudes of epithermal neutron decay components of counting rates of said first detector and said second detector corresponding to epithermal neutrons emanating from said wellbore.

3. The method as defined in claim 1 further comprising the step of calculating a porosity of said earth formation from said epithermal neutron decay rate of said earth formation.

4. The method as defined in claim 1 wherein said first detector and said second detector comprise helium-3 proportional counters.

5. The method as defined in claim 4 wherein said helium-3 proportional counters further each Comprise cadmium foil having a thickness of approximately 0.025 inches applied to the exterior of each of said counters.

6. An apparatus for determining an epithermal neutron decay rate of an earth formation penetrated by a wellbore, comprising:

an elongated housing adapted to traverse said wellbore;

a source of high energy neutrons disposed within said housing;

means for urging a side of said housing into contact with a wall of said wellbore;

a first detector disposed within said housing and axially spaced apart from said source, said first detector adapted to be primarily sensitive to epithermal neutrons emanating from said earth formation, said first detector radially positioned proximally to said side of said housing in contact with said earth formation;

a second detector disposed within said housing and axially spaced between said source and said first detector, said second detector adapted to be primarily sensitive to epithermal neutrons emanating from said wellbore, said second detector axially positioned between said source and said first detector and radially positioned opposite to said side of said housing in contact with said earth formation;

a neutron moderator filling substantially the entire volume within said housing between said first detector and said second detector; and means for transmitting signals to the earth's surface, said signals corresponding to detections of neutrons made by said first and said second detectors.

7. The apparatus as defined in claim 6 wherein said first detector and said second detector comprise helium-3 proportional counters.

8. The apparatus as defined in claim 7 wherein said first detector and said second detector further comprise cadmium foil applied to the exterior of said counters, said foil having a thickness of approximately 0.025 inches.

9. The apparatus as defined in claim 6 wherein said source of high energy neutrons comprises an electrically controllable accelerator-type source.

10. The apparatus as defined in claim 6 wherein said first detector is axially spaced about eight inches from said source.

11. The apparatus as defined in claim 6 wherein said second detector is axially spaced about six inches from said source.

* * * * *